United States Patent
Moshchuk et al.

(10) Patent No.: US 9,278,713 B2
(45) Date of Patent: Mar. 8, 2016

(54) COLLISION AVOIDANCE CONTROL INTEGRATED WITH EPS CONTROLLER

(71) Applicant: GM GLOBAL TECHNOLOGY OPERATIONS LLC, Detroit, MI (US)

(72) Inventors: Nikolai K. Moshchuk, Grosse Pointe, MI (US); Shih-Ken Chen, Troy, MI (US); Chad T. Zagorski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 14/103,073

(22) Filed: Dec. 11, 2013

(65) Prior Publication Data
US 2015/0158528 A1 Jun. 11, 2015

(51) Int. Cl.
*B62D 15/02* (2006.01)
*B62D 5/04* (2006.01)

(52) U.S. Cl.
CPC .................... *B62D 15/0265* (2013.01)

(58) Field of Classification Search
CPC .......................... B62D 15/0265; B62D 5/0463
See application file for complete search history.

(56) References Cited

U.S. PATENT DOCUMENTS

| | | | |
|---|---|---|---|
| 8,190,330 B2 | 5/2012 | Lee | |
| 8,527,172 B2 | 9/2013 | Moshchuk et al. | |
| 2004/0148080 A1* | 7/2004 | Ekmark et al. | 701/41 |
| 2010/0145575 A1* | 6/2010 | Switkes et al. | 701/41 |
| 2013/0218396 A1 | 8/2013 | Moshchuk et al. | |
| 2015/0046015 A1* | 2/2015 | Ulbricht | 701/23 |

OTHER PUBLICATIONS

Wikipedia—Linear-quadratic reguator, printed May 1, 2015.*
Wolfram MathWorld—Newton's Method, printed May 1, 2015.*

* cited by examiner

*Primary Examiner* — John Q Nguyen
*Assistant Examiner* — Alan D Hutchinson
(74) *Attorney, Agent, or Firm* — John A. Miller; Miller IP Group, PLC (57) ABSTRACT

A system and method for generating an overlay torque command for an electric motor in an EPS system for use in a collision avoidance system. The method uses model predictive control that employs a six-dimensional vehicle motion model including a combination of a one-track linear bicycle model and a one-degree of freedom steering column model to model the vehicle steering. The method determines a steering control goal that defines a path tracking error between the current vehicle path and the desired vehicle path through a cost function that includes an optimal total steering torque command. The MPC determines the optimal total steering torque command to minimize the path error, and then uses driver input torque, EPS assist torque and the total column torque command to determine the torque overlay command.

13 Claims, 4 Drawing Sheets

COLLISION AVOIDANCE CONTROL INTEGRATED WITH EPS CONTROLLER

BACKGROUND OF THE INVENTION

1. Field of the Invention

This invention relates generally to a system and method for providing an overlay torque command to control an electric power steering (EPS) motor and, more particularly, to a system and method for providing an overlay torque command to control an EPS motor, where the method employs a six-dimensional vehicle motion model including a one-track linear bicycle model and a one-degree of freedom steering column model for modeling vehicle steering to determine a steering control goal and provide model predictive control (MPC) that determines an optimal total steering column torque from which the overlay torque command is determined.

2. Discussion of the Related Art

Advances in sensor and actuator technologies have enabled the development of driver assistance systems (DAS) to prevent road accidents, especially those caused by driver's mistakes or inattention. Several types of DAS, such as anti-lock braking system (ABS), electronic stability control (ESC), adaptive cruise control (ACC), lane departure warning (LDW) system, lane change assist (LCA), forward collision alert (FCA), and lane keeping assist (LKA), are already in production vehicles. Active safety technology is currently becoming a major area of research in the automotive industry. Collision imminent braking is an effective way of avoiding or mitigating collision by applying brakes. On the other hand, collision avoidance steering may allow collision avoidance in some situations when braking alone can only mitigate it.

Collision avoidance systems are known in the art for providing automatic steering of a subject vehicle to avoid a slower or stopped object in front of the subject vehicle in the event that the vehicle driver does not take evasive action on his own. Known collision avoidance systems provide warnings to the vehicle driver and depending on whether the driver takes evasive action, may provide automatic braking and/or automatic steering. If the system determines that automatic steering is necessary to avoid a collision, the system must calculate a safe steering path for the subject vehicle to provide the steering control. Some of those systems are able to detect lane markings so as to calculate the steering path of the subject vehicle to make a lane change for collision avoidance purposes. Those collision avoidance systems also provide steering commands that cause the subject vehicle to follow the calculated steering path to provide the vehicle steering.

The object detection sensors for these types of systems may use any of a number of technologies, such as short range radar, long range radar, cameras with image processing, laser or LiDAR, ultrasound, etc. The object detection sensors detect vehicles and other objects in the path of a subject vehicle, and the application software uses the object detection information to provide warnings or take actions as appropriate. The warning can be a visual indication on the vehicles instrument panel or in a head-up display (HUD), and/or can be an audio warning or other haptic feedback device, such as seat shaking. In many vehicles, the object detection sensors are integrated directly into the front bumper or other fascia of the vehicle.

U.S. Pat. No. 8,190,330, titled, Model Based Predictive Control for Automated Lane Centering/Changing Control Systems, issued May 29, 2012, assigned to the assignee of this application and herein incorporated by reference, discloses a system and method for providing steering control for lane changing or lane centering purposes in an autonomous or semi-autonomous vehicle driven system. U.S. Pat. No. 8,527,172, titled, Vehicle Collision Avoidance and Warning System, issued Sep. 3, 2013, assigned to the assignee of this application and herein incorporated by reference, discloses a collision avoidance system that employs combined automated braking and steering.

U.S. Patent Application Publication No. 2013/0218396 to Moshchuk et al., assigned to the assignee of this application and herein incorporated by reference, discloses a system and method for providing enhanced vehicle control including providing automatic steering assistance. The '396 application describes a collision avoidance system that employs a steering model using a four-dimensional one-track linear bicycle model to model the vehicle dynamics. The four-dimensional model is used to generate a road wheel angle command necessary to control an electric power steering (EPS) system to provide the steering assistance, where the road wheel angle command is converted to a torque command that is applied to the electric motor in the EPS system. The '396 application uses proportional-integral-derivative (PID) control to convert the road wheel angle command to a torque command for the EPS system. However, employing PID control for this purpose requires extensive tuning to achieve good performance and robust operation at all vehicle speeds. Tuning of the PID control is time consuming and the steering control resulting therefrom may become unstable during tuning. Further, compensation for a steering actuator delay is required.

SUMMARY OF THE INVENTION

This disclosure describes a system and method for generating an overlay torque command for an electric motor in an EPS system for use in a collision avoidance system. The method uses model predictive control that employs a six-dimensional vehicle motion model including a combination of a one-track linear bicycle model and a one-degree of freedom steering column model to model the vehicle steering. The method determines a steering control goal that defines a path tracking error between the current vehicle path and the desired vehicle path through a cost function that includes an optimal total steering torque command. The MPC determines the optimal total steering torque command to minimize the path error, and then uses driver input torque, EPS assist torque and the total column torque command to determine the torque overlay command.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing a torque overlay command for an electric motor in an EPS system is merely exemplary in nature, and is in no way intended to limit the invention or its applications or uses.

Figure 1:
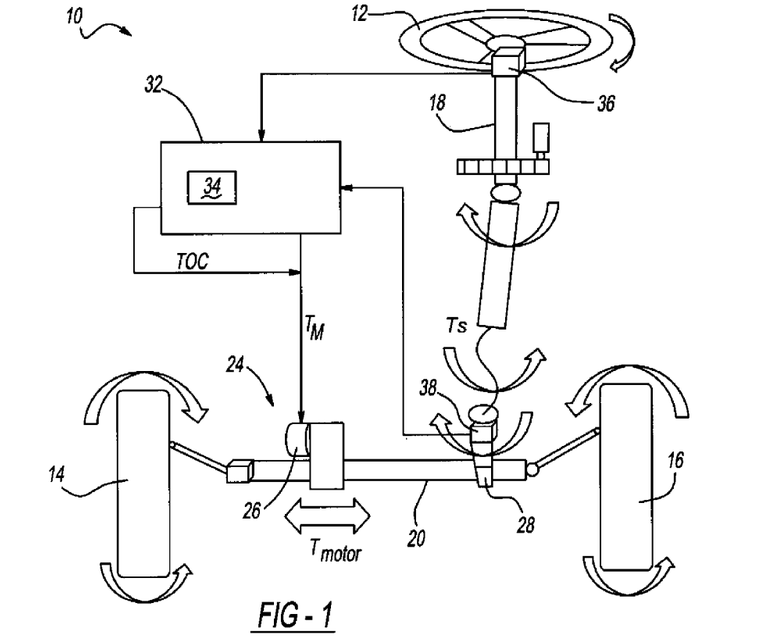
FIG. 1 is an illustration of an exemplary vehicle steering system.

The following description includes a discussion of providing a torque command to a motor in an EPS system. FIG. 1 illustrates an exemplary vehicle steering system 10 including a steering wheel 12 and road wheels 14 and 16 to provide context for this discussion. The steering wheel 12 is coupled to the wheels 14 and 16 through a steering column 18 and an axle 20 in a manner that is well understood by those skilled in the art so that when the driver turns the steering wheel 12 the wheels 14 and 16 turn accordingly.

The steering system 10 includes an electric power steering (EPS) system 24 having an electric steering motor 26 mounted to the axle 20 that provides electric steering assist in response to the vehicle driver turning the steering wheel 12 in a manner that is well understood in the art. In other words, when the vehicle driver turns the steering wheel 12, the EPS system 24 turns the wheels 14 and 16 the amount commanded by the vehicle driver so that the turning of the wheels 14 and 16 on the roadway is easier. The motor 26 also provides the steering torque for collision avoidance steering. The steering system 10 also includes an EPS electronic control unit (ECU) 32, which in one embodiment is configured to provide overall EPS system control. As would be well understood by one of ordinary skill in the art, the EPS system 24 electrically assists a driver in the steering of the vehicle by applying a variable motor torque command $T_M$ to the steering motor 26 and, as needed, a torque overlay command (TOC) that alters the value of the motor torque command $T_M$ during an EPS-assisted steering maneuver.

A steering angle sensor 36 mounted to the steering column 18 measures the rotation of the steering wheel 12 and the steering column 18 and provides a steering angle signal $\theta_s$ indicative of same. A torque sensor 38 mounted to the steering column 18 measures the torque on the steering column 18 and provides a torque signal $T_s$ indicative of same. The ECU 32 is in electrical communication with the angle sensor 36 and the torque sensor 38 such that the steering angle signal $\theta_s$ and the steering torque signal $T_s$ are made available to the ECU 32. The ECU 32 processes a set of vehicle performance values, including the steering angle signal $\theta_s$ and the steering torque $T_s$, and that continuously monitors vehicle parameters, such as, but not limited to, the speed of the vehicle. Alternately, instead of using the steering angle sensor 36 to provide the steering angle, a pinion angle (PA) sensor 28 can be employed to provide the steering angle, which gives a more direct measurement of road wheel angle, as is well understood by those skilled in the art.

The present invention proposes an algorithm for providing a torque overlay command to the electric motor 26 in the EPS system 24 that is a command for automatic vehicle steering as part of a collision avoidance system. The torque overlay command is a correction torque provided to steer the vehicle in addition to what the vehicle driver provides on the vehicle steering wheel and the steering assistance provided by the EPS system 24. An EPS assist boost curve defines the driver steering assist at different vehicle speeds in addition to the driver's steering input, which is provided in a typical passenger vehicle. The present invention uses model predictive control (MPC) that employs a six-dimensional vehicle steering model. The vehicle steering model is a combination of a one-track linear bicycle model to provide vehicle dynamics and a one-degree of freedom steering column model. Once the model is established, the algorithm defines a steering control goal for minimizing a path tracking error of the vehicle between the current vehicle path and the desired vehicle path, where the control goal defines a relationship between a cost function and an optimal total steering column torque. Once the control goal is defined, the algorithm uses the MPC to determine the optimal total steering column torque to minimize the path error, and then uses the EPS assist boost curve and torsion bar torque to find the torque overlay command that provides that optimal total torque.

As mentioned, the first step in the process is to generate a mathematical steering model to be used by the MPC, which is a dynamic vehicle model provided through equations of motion. In one embodiment, the model is a six-dimensional model including a combination of a one-track bicycle model and a one-degree of freedom steering column model. As will be discussed in detail below, the one-track linear bicycle model provides four of the dimensions, namely, lateral offset $\Delta y$ of the vehicle center of gravity from the road, vehicle heading angle error $\Delta \Psi$, vehicle lateral velocity $V_y$ and vehicle yaw rate r. The one-degree of freedom steering column model provides the other two dimensions, namely, steering wheel angle $\phi$ (or pinion angle) and steering wheel angle rotation rate $\dot{\phi}$.

Figure 2:
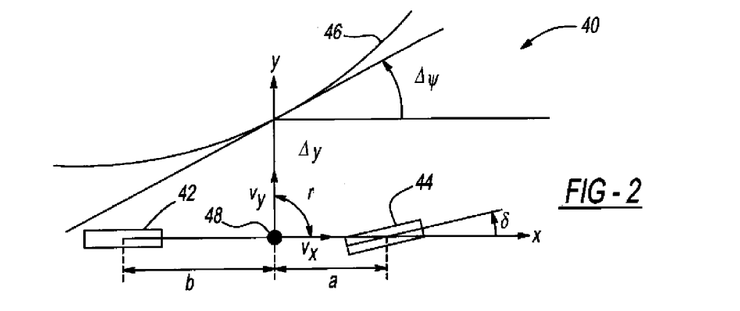
FIG. 2 is an illustration of a one-track linear bicycle model.

A one-track linear bicycle model is shown by illustration 40 in FIG. 2 including wheels 42 and 44, vehicle center of gravity 48 and traveled road 46, and describes vehicle position with respect to the lane markings of the road and clarifies sign convention. The state-space model for vehicle motion includes equations defining relationships of the vehicle to the road 46 as:

$$\Delta \dot{y} = V_x \Delta \Psi + V_y, \tag{1}$$

$$\Delta \dot{\Psi} = r - V_x \chi, \tag{2}$$

and a classical bicycle model for single track as:

$$\dot{V}_y = -\frac{C_f + C_r}{MV_x} V_y - \left(V_x + \frac{aC_f - bC_r}{MV_x}\right) r + \frac{C_f}{M} \delta_f, \tag{3}$$

$$\dot{r} = \frac{aC_f - bC_r}{I_z V_x} V_y - \frac{a^2 C_f + b^2 C_r}{I_z V_x} r + \frac{aC_f}{I_z} \delta_f, \tag{4}$$

where $\Delta y$ is the lateral offset of the vehicle center of gravity from the lane (lane offset), $\Delta \Psi$ is the vehicle heading with respect to the lane (lane heading), $V_y$ is the vehicle lateral velocity, r is the vehicle yaw rate, $V_x$ is the vehicle longitudinal velocity, $C_f$ and $C_r$ are the cornering stiffness of the front and rear axles, respectively, a is the distance from the vehicle's center of gravity to the vehicle's front axle, b is the distance from the vehicle's center of gravity to the vehicle's rear axle, M is the mass of the vehicle, $I_z$ is the yaw moment of inertial of the vehicle, $\chi$ is the path curvature, and $\delta_f$ is the front road wheel angle.

It is assumed that the front and rear axle lateral forces $F_f$ and $F_r$ are linear functions of lateral slip angles as:

$$F_f = C_f \alpha_f, \tag{5}$$

$$F_r = C_r \alpha_r, \tag{6}$$

where $\alpha_f$ and $\alpha_r$ are front and rear slip angles, respectively, and where:

$$\alpha_f = \delta_f - \frac{V_y}{V_x} - \frac{a}{V_x}r, \qquad (7)$$

$$\alpha_r = \frac{V_y}{V_x} + \frac{b}{V_x}r. \qquad (8)$$

The state variables $\Delta y$ and $\Delta \Psi$ define the relationship of the vehicle to the lane, where equations (3) and (4) are decoupled from equations (1) and (2) and describe the vehicle dynamic model in a planar motion. Equations (1)-(4) can be written in the state-space form as:

$$\dot{x} = Ax + B\delta + h, \qquad (9)$$

$$y = Cx, \qquad (10)$$

where $x = [\Delta y, \Delta \Psi, V_y, r]^T$ is the state vector, $y = [\Delta y, \Delta \Psi]^T$ is the output vector, $\delta$ is the control variable, $h$ is the curvature term that can be viewed as a known disturbance, and governing matrices in equations (9) and (10) have the following form.

$$A = \begin{bmatrix} 0 & V_x & 1 & 0 \\ 0 & 0 & 0 & 1 \\ 0 & 0 & a_{11} & a_{12} \\ 0 & 0 & a_{21} & a_{22} \end{bmatrix}, \qquad (11)$$

$$B = \begin{bmatrix} 0 \\ 0 \\ b_1 \\ b_2 \end{bmatrix}, \qquad (12)$$

$$C = \begin{bmatrix} 1 & 0 & 0 & 0 \\ 0 & 1 & 0 & 0 \end{bmatrix}, \qquad (13)$$

$$h = \begin{bmatrix} 0 \\ -\chi V_x \\ 0 \\ 0 \end{bmatrix}, \qquad (14)$$

$$a_{11} = \frac{C_f + C_r}{MV_x}, \qquad (15)$$

$$a_{12} = -V_x - \frac{aC_f - bC_r}{MV_x}, \qquad (16)$$

$$a_{21} = -\frac{aC_f - bC_r}{I_z V_x}, \qquad (17)$$

$$a_{22} = -\frac{a^2 C_f + b^2 C_r}{I_z V_x}, \qquad (18)$$

$$b_1 = \frac{C_f}{M}, \qquad (19)$$

$$b_2 = \frac{aC_f}{I_z}. \qquad (20)$$

Equations (9) and (10) are a linear time invariant system with a known (measured) disturbance. The output vector y includes estimated or measured camera variables. The yaw rate r is measured by a yaw rate sensor and the lateral speed $V_y$ is estimated based on other available measurements.

Figure 3:
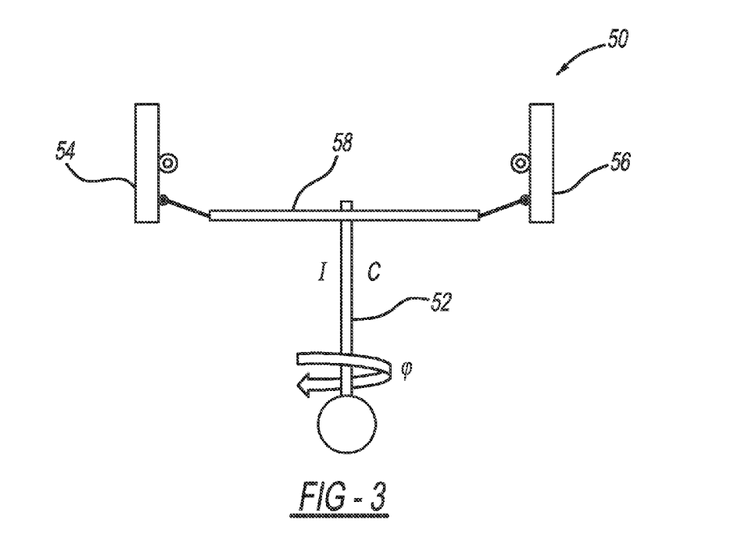
FIG. 3 is an illustration of a vehicle steering column defining parameters for a vehicle steering column model.

FIG. 3 is a schematic diagram showing a simplified steering system 50 depicting the variables for the steering model. The steering system 50 includes front road-wheels 54 and 56, front axle 58 and steering column 52. The equation describing the steering column dynamics can be given as:

$$I\ddot{\phi} + c\dot{\phi} = M_{eps} + M_Z + M_{HW}, \qquad (21)$$

where the self aligning torque $M_Z$ is defined as:

$$M_Z = 2D_F \alpha_f, \qquad (22)$$

and where $\phi$ is the steering wheel angle (or pinion angle), I is the steering-inertia, c is a damping coefficient, $M_{eps}$ is the EPS torque (total), and $M_{HW}$ is the hand-wheel torque (drivers input).

The control variable for the total torque command control variable $u = M_{eps} + M_{HW}$ includes the total EPS torque plus the hand-wheel torque. However, only the dual torque overlay command (delta torque) can be sent to the EPS controller 32. If the total column torque u is known, then the required amount of torque overlay can be found using EPS boost tables, as will be discussed below.

Modeling equations for vehicle dynamics can now be written in the state-space form, where $x = [\Delta y, \Delta \Psi, V, r, \dot{\phi}, \phi]^T$ is the state vector, $y = [\Delta y, \Delta \Psi,]^T$ is the output vector, and u is the total torque command control variable, where governing matrices have the following form:

$$A = \begin{bmatrix} 0 & V_x & 1 & 0 & 0 & 0 \\ 0 & 0 & 0 & 1 & 0 & 0 \\ 0 & 0 & a_{11} & a_{12} & 0 & \frac{b_1}{n} \\ 0 & 0 & a_{21} & a_{22} & 0 & \frac{b_2}{n} \\ 0 & 0 & \frac{2D_f}{IV_x} & \frac{2D_f a}{IV_x} & -\frac{c}{I} & -\frac{2D_f}{nI} \\ 0 & 0 & 0 & 0 & 1 & 0 \end{bmatrix}, \qquad (23)$$

$$B = \begin{bmatrix} 0 \\ 0 \\ 0 \\ 0 \\ 1 \\ 0 \end{bmatrix}, \qquad (24)$$

$$C = \begin{bmatrix} 1 & 0 & 0 & 0 & 0 & 0 \\ 0 & 1 & 0 & 0 & 0 & 0 \end{bmatrix}, \qquad (25)$$

$$h = [0 \; -\chi V_x \; 0 \; 0 \; 0 \; 0]^T. \qquad (26)$$

A different variant of the six-dimensional model can be obtained by considering the steering system up to the torsion bar. Only steering inertia downstream of the torsion bar is included in the lumped moment of inertia I. Such an approach has the following significant advantage, where it does not require the knowledge of the hand-wheel torque $M_{HW}$, which is not measured directly and therefore must be estimated. At the same time, torsion bar torque is a measured quantity. Equation (21) has the same form in this case with the hand-wheel torque $M_{HW}$ replaced by the torsion bar torque $M_{TBT}$.

Based on the foregoing, the combined linear bicycle model and steering column model can be discretized to yield the following discrete system.

$$x_{k+1} = A_d x_k + B_d u_k + h_k, \qquad (27)$$

$$y_k = C_d x_k. \qquad (28)$$

Figure 4:
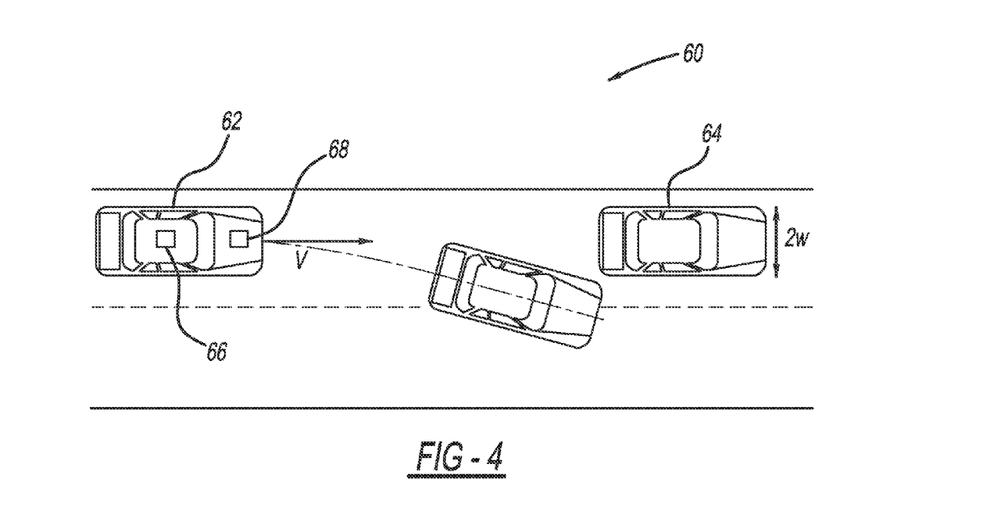
FIG. 4 is an illustration of a subject vehicle trailing a target vehicle and showing an evasive steering path for the subject vehicle to travel around the target vehicle for collision avoidance purposes.

FIG. 4 is an illustration 60 showing a subject vehicle 62 traveling behind a target vehicle 64, where the target vehicle 64 is traveling slower than the subject vehicle 62 or is stopped.

The target vehicle 64 is intended to represent any object in front of the subject vehicle 62 that is within a collision path of the travel direction of the subject vehicle 62. The subject vehicle 62 includes a collision avoidance system 66 that is operable to perform the various calculations and operations as discussed herein. The collision avoidance system 66 receives sensor signals from one or more sensors, represented generally as sensor 68, which can be any suitable sensor for the purposes discussed herein, such as radar, LiDAR, camera, ultrasonic sensors, etc.

The goal of the steering control is to minimize the deviation of the vehicle center of gravity from the planned or desired path. Many algorithms are known in the art to define a desired steering path for collision avoidance purposes. As will be discussed below, the steering control goal obtains the total torque command control variable u that minimizes a cost function J. The planned path (or reference trajectory) at any time instant k is a set of points $r_{k+j}$, j=1, 2, ..., p. Each point $r_{k+j}$ is a two-dimensional vector including the lane lateral position of the vehicle center of gravity, and relative to the vehicle heading angle $\Delta\Psi$. The number p of set points is driven by a prediction horizon $T_p = pT_s$, where $T_s$ is a sampling time. Future outputs of the mathematical model of equation (27) should follow the reference trajectory $r_{k+j}$, or in other words, the cost function J associated with the errors $y_{k+j} - r_{k+j}$, j=1, 2, ..., p should be minimized.

For linear systems and the quadratic cost function J, the explicit formula for MPC control is well known. The amount of computations increases drastically with the increase of the control horizon since it involves inverting the matrix of the size equal to the number of control horizon samples. Therefore, it is considered important for a practical implementation case when the control horizon is equal to one sampling time. Thus, it is assumed that the control variable $u_k$ is the same for the whole prediction horizon (p steps ahead). The cost function J is assumed to be quadratic as:

$$J_0 = \Sigma_{j=1}^{j=p}[(y_{k+j} - r_{k+j})^T Q_{k+j}(C_d x_{k+j} - r_{k+j})] + R_k u_k^2, \quad (29)$$

where $Q_{k+j}$ is a 2×2 weight matrix penalizing deviation from the reference trajectory (output weight), and $R_k$ is a 2×2 weight matrix penalizing relative big changes in control (input weight). Both of the weights $Q_{k+j}$ and $R_k$ are typically diagonal matrices with positive diagonal elements.

Substituting $y_{k+j} = C_d X_{k+j}$ into equation (29) yields:

$$J_0 = \Sigma_{j=1}^{j=p}[(C_d x_{k+j} - r_{k+j})^T Q_{k+j}(C_d x_{k+j} - r_{k+j})] + R_k u_k^2, \quad (30)$$

The state variable $x_k$ at any future step j can be derived from equation (27) and has the following form.

$$x_{k+j} = A_d^j x_k + (\Sigma_{i=1}^j A_d^{i-1})(B_d u_k + h_k). \quad (31)$$

It is assumed in equation (31) that the curvature does not significantly change during the prediction time (typically 0.8 seconds). Generalization of equation (31) for the case of known curvatures $h_{k+1}, h_{k+2}, \ldots h_{k+j}$ for each of the prediction steps is straightforward. Substituting equation (31) into the cost function (30) yields:

$$J_0 = \Sigma_{j=1}^{j=p}[C_d A_d^j x_k + C_d(\Sigma_{i=1}^j A_d^{i-1})(B_d u_k + h_k) - r_{k+j}]^T Q_{k+j} \times [C_d A_d^j X_k + (\Sigma_{i=j}^j A_d^{i-1})(B_d u_k + h_k) - r_{k+j}] + R_k u_k^2, \quad (32)$$

where $A_d, B_d, C_d$ and $h_k$ are discreet versions of matrices A, B, C and h, respectively, $Q_{k+j}$ is a weight on path tracking error, $R_k$ is a weight on actuator command, and $r_{k+j}$ is a vector of set points.

Equation (32) shows that the cost function J is a quadratic function of the unknown control variable $u_k$, where it reaches its minimum when:

$$\frac{dJ_0}{du_k} = 0, \quad (33)$$

$$R_k u_k + \sum_{j=1}^{j=p} \left(C_d \sum_{i=1}^{j} A_d^{i-1} B_d\right)^T Q_{k+j}\left[C_d A_d^j x_k + C_d \sum_{i=1}^{j} A_d^{i-1}(B_d u_k + h_k) - r_{k+j}\right] = 0. \quad (34)$$

Equation (33) yields the following expression for the unknown total column torque control variable $u_k$.

$$u_k = \frac{\sum_{j=1}^{j=p}\left(C_d \sum_{i=1}^{j} A_d^{i-1} B_d\right)^T Q_{k+j}\left[r_{k+j} - C_d A_d^j x_k - C_d \sum_{i=1}^{j} A_d^{i-1} h_k\right]}{R_k + \sum_{j=1}^{j=p}\left(C_d \sum_{i=1}^{j} A_d^{i-1} B_d\right)^T Q_{k+j}\left(C_d \sum_{i=1}^{j} A_d^{i-1} B_d\right)}. \quad (35)$$

The unconstrained linear MPC is a standard linear state-feedback law. The expression for the optimal linear control equation (35) can thus be represented in a feedback form as:

$$u_k = K_k x_k + v_k, \quad (36)$$

where the feedback gain matrix $K_k$ and the feed-forward term $v_k$ are:

$$K_k = \frac{\sum_{j=1}^{j=p}\left(C_d \sum_{i=1}^{j} A_d^{i-1} B_d\right)^T Q_{k+j} C_d A_d^j}{R_k + \sum_{j=1}^{j=p}\left(C_d \sum_{i=1}^{j} A_d^{i-1} B_d\right)^T Q_{k+j}\left(C_d \sum_{i=1}^{j} A_d^{i-1} B_d\right)}, \quad (37)$$

$$v_k = \frac{\sum_{j=1}^{j=p}\left(C_d \sum_{i=1}^{j} A_d^{i-1} B_d\right)^T Q_{k+j}\left[r_{k+j} - C_d \sum_{i=1}^{j} A_d^{i-1} h_k\right]}{R_k + \sum_{j=1}^{j=p}\left(C_d \sum_{i=1}^{j} A_d^{i-1} B_d\right)^T Q_{k+j}\left(C_d \sum_{i=1}^{j} A_d^{i-1} B_d\right)}. \quad (38)$$

Equation (38) can be successfully implemented online, since it is relatively simple and does not involve matrix inversion. Consider the sub-case of a constrained MPC (control horizon is still one sample time). Constraints may arise from the limits imposed on the maximum allowable front/rear axle slip angle, lateral acceleration, lateral jerk, delta torque, and delta torque rate. Such a constraint in general can be represented as:

$$L_1 \leq F x_k + G u_k \leq L_2. \quad (39)$$

Since $x_k$ is known, the problem of finding the optimal torque control variable $u_k$ reduces to finding a global minimum of the quadratic function J in the control variable $u_k$ subject to equation (39). Such a problem can be solved in a standard quadratic programming manner.

Figure 5:
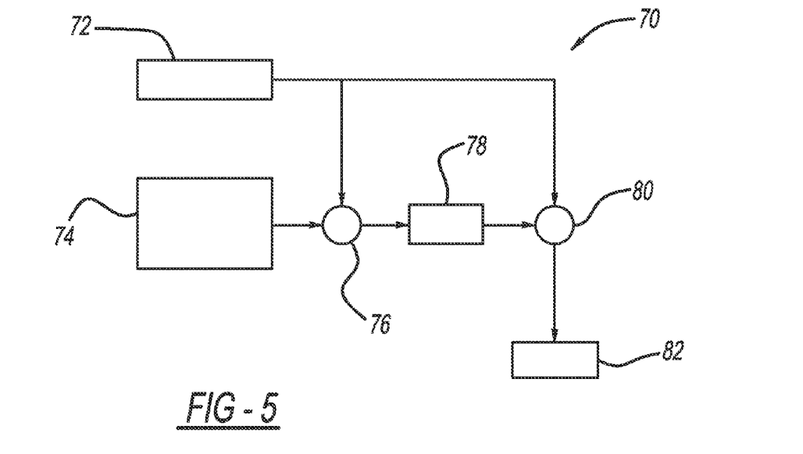
FIG. 5 is a block diagram of a system for providing total steering column torque.

Once the MPC calculates the total column torque command variable $u_k$, then the torque overlay command is determined therefrom by the relationship between the driver input torque, sometimes referred to herein as torsion bar torque, and the EPS assist torque obtained from an EPS boost curve table for different vehicle speeds, and the last calculated total torque. The torque overlay command is the torque provided to the EPS motor 26 when the collision avoidance system 66 takes over steering control, where the torque overlay command is applied twice in the steering system and as such is referred to as a dual torque overlay (DTO) command. This is illustrated in FIG. 5 by block diagram 70. Particularly, the dual torque overlay command is provided at box 72 and is added to the driver input torsion bar torque from box 74 at summation junction 76. The EPS assist torque from the boost curve table is determined based on that summation at box 78 and the overlay torque command is added to the boost curve torque at summation junction 80 to give the total torque command applied to the EPS motor 82.

Figure 6:
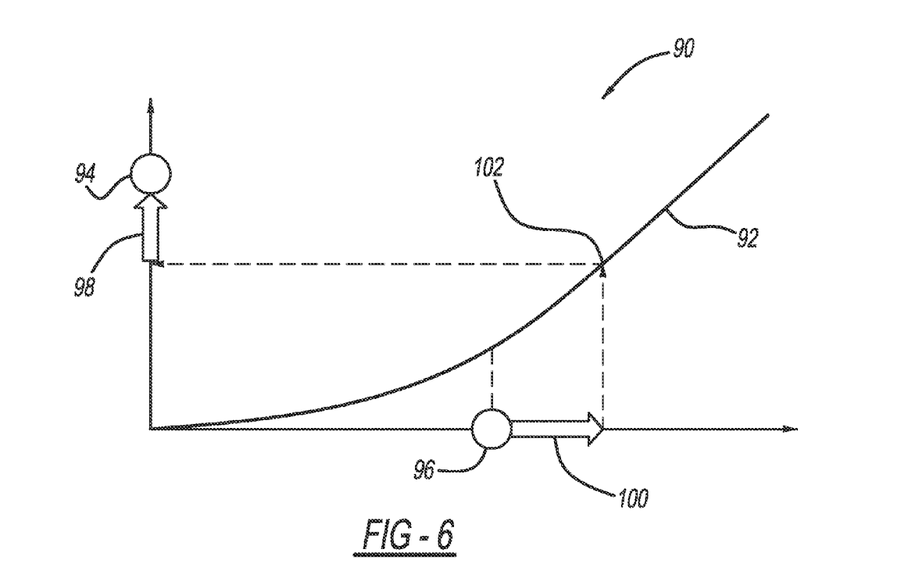
FIG. 6 is a graph showing total torque on the horizontal axis and driver input torque on the vertical axis and illustrating an EPS boost curve.

FIG. 6 is a graph 90 showing driver input torsion bar torque on the horizontal axis, total torque command on the vertical axis and an EPS boost curve torque 92 for a particular vehicle speed. For one example, the total torque command is shown on the vertical axis at point 94 and the driver input torsion bar torque is shown at point 96 on the horizontal axis. Since the total torque command is known at point 94 and the boost curve torque at point 102 on the graph line 92 is known, the boost curve torque can be super-imposed on the vertical axis and that torque value can be subtracted from the total torque to give the dual torque overlay command at arrow 98. Likewise, since the driver input torque is known at the point 96 and the boost curve assist torque is known at the point 102, the torque overlay command can also be determined on the horizontal axis by arrow 100.

The algorithm can determine the dual torque overlay command using the known total torque command, driver torsion bar torque and EPS boost curve assist torque, so that the total torque delivered matches the total torque required, which can be done using the following nonlinear algebraic equation:

$$f(TBT+TO)+HWT+TO=TT, \quad (40)$$

where TBT is the torsion bar torque, $f(TBT)$ is the boost curve assist torque corresponding to the current vehicle longitudinal velocity, TO is the dual torque overlay command, HWT is the hand-wheel torque, and TT is the total torque.

Equation (40) can be solved numerically online using the Newton-Raphson method, where only a few iterations are needed to get satisfactory accuracy. If $f(x)=kx+b$ is a linear function (or piecewise linear), then equation (40) can be solved as:

$$TO = \frac{TT - HWT - b - kTBT}{k+1}. \quad (41)$$

If there is a linear approximation between points TBT and $f^{-1}$ (TT−HWT), then an approximate solution has the form:

$$TO = \frac{TT - HTW - f(TBT)}{1 + \frac{TT - HWT - f(TBT)}{f^{-1}(TT - HWT) - TBT}}. \quad (42)$$

For a different variant of the six-dimensional model, which is obtained by considering the steering system up to the torsion bar, equation (40) has the form:

$$f(TBT+TO)+TO+TBT=TT. \quad (43)$$

If TBT+TO is denoted as new variable x, then equation (43) is a nonlinear equation with respect to x $$f(x)+x=TT. \quad (44)$$

Equation (44) can be solved numerically online using the Newton-Raphson method. Alternatively, equation (44) can be solved using an inverse look-up table $y(x)=x+f(x)$. The function $f$ is a known function (boost table), therefore $y(x)$ is also a known function. For a given y=TT, x can be found using the look-up table $y(x)$. Finally, the torque overlay command can be found by subtracting TBT from x as:

$$TO=x-TBT. \quad (45)$$

Note that the inverse look-up table can be used in equation (40) by rewriting equation (40) in the following form:

$$f(TBT+TO)+TBT+TO+HWT-TBT=TT, \quad (46)$$

or:

$$f(x)+x=TT-(HWT-TBT). \quad (47)$$

Figure 7:
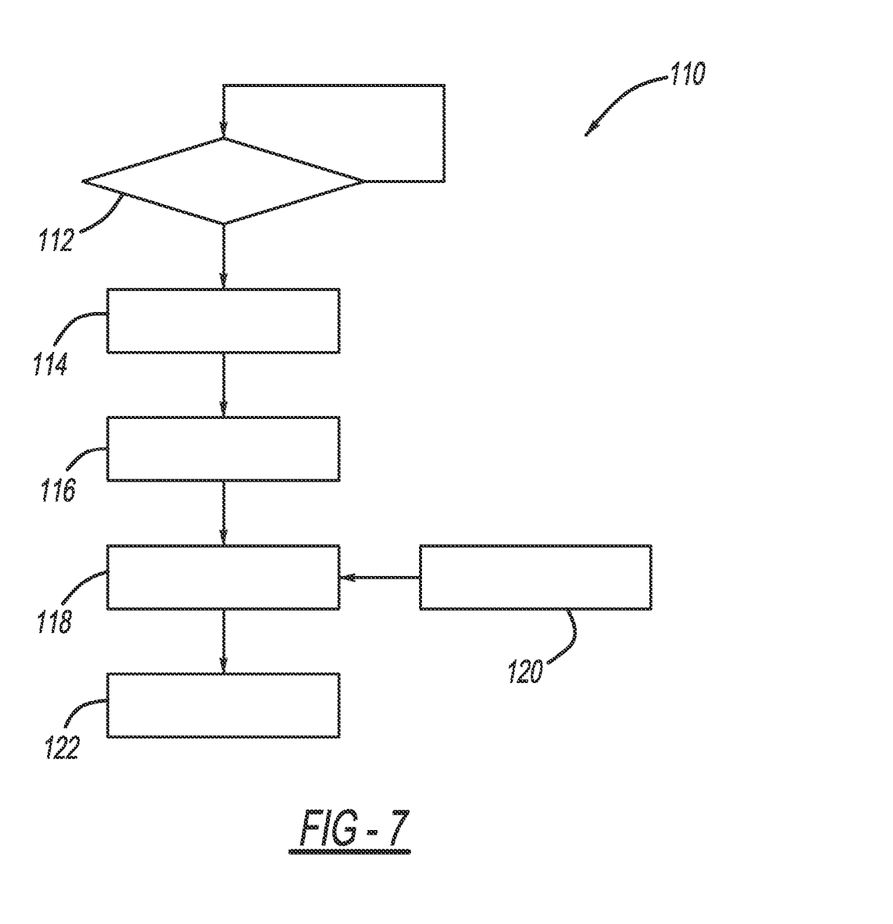
FIG. 7 is a flow chart diagram showing a process for providing a torque overlay command for an electric motor in an EPS system.

FIG. 7 is a flow chart diagram 110 showing a process for providing a torque overlay command to the motor 26 in the EPS system 24 when steering control is required as discussed above. The algorithm determines if the collision avoidance system is activated at decision diamond 112. If the collision avoidance system is activated, the algorithm reads sensor data to determine the position of the vehicle in the lane, and defines a control steering goal that minimizes the path tracking error to follow the center of the lane using the steering model and the cost function J at box 114. The algorithm then uses the MPC to determine the optimal total steering column torque command u as discussed above at box 116. The algorithm then uses the driver input torsion bar torque, the total steering column torque, and the EPS assist boost table torque for the current vehicle speed to determine the dual torque overlay command as discussed above at box 118, where the EPS assist boost table information is provided at box 120. The algorithm then sends the total torque command to the EPS motor 26 at box 122.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing a torque overlay command in a collision avoidance system that is at least part of a torque command provided to an electric power steering (EPS) motor on a vehicle, said method comprising:

providing a mathematical model of a vehicle steering system;

determining a difference between a current vehicle path and a desired vehicle path;

providing model predictive control to determine an optimal total column torque command for the motor that minimizes the difference;

providing an EPS torque assist command based on vehicle speed;

determining the torque overlay command using the optimal total column torque command, a driver provided torque and the EPS torque assist command for a particular vehicle speed, where determining the torque overlay command includes solving a nonlinear algebraic equation given by:

$$f(TBT+TO)+HWT+TO=TT$$

where TBT is the driver provided torque, TO is the torque overlay command, HWT is hand-wheel torque, TT is the total column torque command, and $f$ is a function defining the EPS torque assist command, and a Newton-Raphson iteration technique is used to solve the equation; and providing the total column torque command to the EPS motor.

2. The method according to claim 1 wherein providing a mathematical model includes providing a six-dimensional mathematical model.

3. The method according to claim 2 wherein providing a mathematical model includes providing a mathematical model that is a combination of a one-track bicycle model and a one-degree of freedom steering column model.

4. The method according to claim 3 wherein providing a mathematical model includes using the one-track bicycle model to provide model dimensions of lateral offset of a vehicle center of gravity from the desired vehicle path, a vehicle heading angle error, vehicle lateral velocity and vehicle yaw rate, and the one-degree of freedom steering column model provides dimension parameters of steering wheel angle and steering wheel angle rotation rate.

5. The method according to claim 1 wherein determining a difference includes defining a relationship between the total column torque command and a cost function.

6. The method according to claim 5 wherein the cost function is a quadratic function.

7. The method according to claim 6 wherein the quadratic function is defined by an equation:

$$J_0 = \Sigma_{j=1}^{j=p}[(y_{k+j}-r_{k+j})^T Q_{k+j}(C_d x_{k+j}-r_{k+j})]+R_k u_k^2,$$

where $J_0$ is the cost function, $Q_{k+j}$ is a 2×2 weight matrix, and $R_k$ is a 2×2 weight matrix, y is vehicle lateral deviation, r is yaw rate and $u_k$ is the total column torque command.

8. The method according to claim 7 wherein providing model predictive control includes determining the total column torque command using an equation:

$$u_k = \frac{\sum_{j=1}^{j=p}\left(C_d \sum_{i=1}^{j} A_d^{i-1} B_d\right)^T Q_{k+j}\left[r_{k+j} - C_d A_d^j x_k - C_d \sum_{i=1}^{j} A_d^{i-1} h_k\right]}{R_k + \sum_{j=1}^{j=p}\left(C_d \sum_{i=1}^{j} A_d^{i-1} B_d\right)^T Q_{k+j}\left(C_d \sum_{i=1}^{j} A_d^{i-1} B_d\right)}$$

where $A_d$, $B_d$, $C_d$ and $h_k$ are discreet versions of matrices A, B, C and h, respectively, $Q_{k+j}$ is a weight on path tracking error, $R_k$ is a weight on actuator command, and $r_{k+j}$ is a vector of set points.

9. The method according to claim 1 wherein providing the EPS torque assist command includes providing the EPS torque assist command from a boost curve table.

10. A method for providing a torque overlay command in a collision avoidance system that is at least part of a torque command provided to an electric power steering (EPS) motor on a vehicle, said method comprising:

providing a six-dimensional vehicle steering model that is a combination of a one-track bicycle model and a one-degree of freedom steering column model, where the one-track bicycle model provides model dimensions of lateral offset of a vehicle center of gravity, a vehicle heading angle, vehicle lateral velocity and vehicle yaw rate, and the one-degree of freedom steering column model provides dimension parameters of steering wheel angle and steering wheel angle rotation rate;

determining a difference between a current vehicle path and a desired vehicle path including defining a relationship between a total torque command and a quadratic cost function;

providing model predictive control to determine the total torque command for the motor that minimizes the difference;

providing an EPS assist torque from an EPS boost curve table;

determining the torque overlay command using the total torque command, a driver provided torque and the EPS assist torque, where determining the torque overlay command includes solving a nonlinear algebraic equation given by:

$$f(TBT+TO)+TBT+TO=TT$$

where TBT is the driver provided torque, TO is the torque overlay command, TT is the total column torque command, and $f$ is a function defining the EPS assist torque, and an inverse table look-up technique is used to solve the equation; and providing the total torque command to the EPS motor.

11. The method according to claim 10 wherein the quadratic cost function is defined by an equation:

$$J_0 = \Sigma_{j=1}^{j=p}[(y_{k+j}-r_{k+j})^T Q_{k+j}(C_d x_{k+j}-r_{k+j})]+R_k u_k^2,$$

where $J_0$ is the quadratic cost function, $Q_{k+j}$ is a 2×2 weight matrix, and $R_k$ is a 2×2 weight matrix, y is vehicle lateral deviation, r is yaw rate and $u_k$ is the total torque command.

12. The method according to claim 11 wherein providing model predictive control includes determining the total torque command using an equation:

$$u_k = \frac{\sum_{j=1}^{j=p}\left(C_d \sum_{i=1}^{j} A_d^{i-1} B_d\right)^T Q_{k+j}\left[r_{k+j} - C_d A_d^j x_k - C_d \sum_{i=1}^{j} A_d^{i-1} h_k\right]}{R_k + \sum_{j=1}^{j=p}\left(C_d \sum_{i=1}^{j} A_d^{i-1} B_d\right)^T Q_{k+j}\left(C_d \sum_{i=1}^{j} A_d^{i-1} B_d\right)}$$

where $A_d$, $B_d$, $C_d$ and $h_k$ are discreet versions of matrices A, B, C and h, respectively, $Q_{k+j}$ is a weight on path tracking error, $R_k$ is a weight on actuator command, and $r_{k+j}$ is a vector of set points.

13. A steering system for providing a torque overlay command in a collision avoidance system that is at least part of a torque command provided to an electric power steering (EPS) motor on a vehicle, said steering system comprising:

means for providing a six-dimensional vehicle steering model that is a combination of a one-track bicycle model and a one-degree of freedom steering column model, where the one-track bicycle model provides model dimensions of lateral offset of a vehicle center of gravity lateral deviation, a vehicle heading angle, vehicle lateral velocity and vehicle yaw rate, and the one-degree of freedom steering column model provides dimension parameters of steering wheel angle and steering wheel angle rotation rate;

means for determining a difference between a current vehicle path and a desired vehicle path including defining a relationship between a total torque command and a quadratic cost function;

means for providing model predictive control to determine the total torque command for the motor that minimizes the difference;

means for providing an EPS assist torque from an EPS boost curve table;

means for determining the torque overlay command using the total torque command, a driver provided torque and the EPS assist torque, where means for determining the torque overlay command includes means for solving a nonlinear algebraic equation given by:

$f(TBT+TO)+HWT+TO=TT$ where TBT is the driver provided torque, TO is the torque overlay command, HWT is hand-wheel torque, TT is the total column torque command, and $f$ is a function defining the EPS torque, and a Newton-Raphson iteration technique is used to solve the solve the equation; and means for providing the total torque command to the EPS motor.

* * * * *